US012642162B2

(12) United States Patent (10) Patent No.: US 12,642,162 B2
Luebben et al. (45) Date of Patent: Jun. 2, 2026

(54) GRAIN-SINGULATING APPARATUS WITH SEPARATING DEVICE, AND SEEDER WITH GRAIN-SINGULATING APPARATUS

(71) Applicant: Amazonen-Werke H. Dreyer SE & Co. KG, Hasbergen (DE)

(72) Inventors: Jan-Eike Luebben, Edewecht (DE); Thomas Wien, Stuhr (DE)

(73) Assignee: AMAZONEN-WERKE H. DREYER SE & CO. KG, Hasbergen (DE)

( * ) Notice: Subject to any disclaimer, the term of this patent is extended or adjusted under 35 U.S.C. 154(b) by 458 days.

(21) Appl. No.: 18/021,539

(22) PCT Filed: Aug. 10, 2021

(86) PCT No.: PCT/EP2021/072213
§ 371 (c)(1),
(2) Date: Feb. 15, 2023

(87) PCT Pub. No.: WO2022/037992
PCT Pub. Date: Feb. 24, 2022

(65) Prior Publication Data
US 2023/0389464 A1 Dec. 7, 2023

(30) Foreign Application Priority Data
Aug. 20, 2020 (DE) .................... 10 2020 121 869.9

(51) Int. Cl.
*A01C 7/04* (2006.01)

(52) U.S. Cl.
CPC .......... *A01C 7/0443* (2023.05); *A01C 7/0445* (2023.05); *A01C 7/046* (2013.01)

(58) Field of Classification Search
CPC ....... A01C 7/042; A01C 7/044; A01C 7/0443; A01C 7/0445; A01C 7/046
See application file for complete search history.

(56) References Cited

U.S. PATENT DOCUMENTS

| | | | | |
|---|---|---|---|---|
| 5,156,102 A | * | 10/1992 | Andersen | ............... A01C 7/081 |
| | | | | 111/178 |
| 2015/0189827 A1 | * | 7/2015 | Gilstring | ................ A01C 7/082 |
| | | | | 222/1 |

FOREIGN PATENT DOCUMENTS

| | | | | |
|---|---|---|---|---|
| DE | 102017130709 A1 | * | 6/2019 | .......... A01C 7/0445 |
| EP | 2497351 A1 | * | 9/2012 | ............. A01C 7/044 |

(Continued)

OTHER PUBLICATIONS

International Search Report for International Application No. PCT/EP2021/072213 dated Nov. 29, 2021 (includes English language translation).

(Continued)

*Primary Examiner* — Matthew R Buck
(74) *Attorney, Agent, or Firm* — Potomac Law Group, PLLC; John J. Penny, Jr.

(57) ABSTRACT

A grain-singulating apparatus comprising, a metering chamber and a singulating disk arranged therein, at least one supply duct for feeding a singulating air flow generated by a blower into said metering chamber for the singulation of grains by way of said singulating disk, a conveying duct for supplying the grains stored in the storage container, in the form of a mixed grain/air flow generated by the blower, and a separating device for the separation of the grains from said mixed grain/air flow and for providing them via a seed chute to said singulating disk for singulation and for feeding the resulting extracted air flow via an extracted air duct separate from said supply duct to said grain-singulating apparatus for the singulation of the grains.

15 Claims, 4 Drawing Sheets

(56) References Cited

FOREIGN PATENT DOCUMENTS

| EP | 3335535 A1 | 6/2018 |
| EP | 3586586 A1 | 1/2020 |
| EP | 3704923 A1 | 9/2020 |
| WO | 2011056123 A1 | 5/2011 |
| WO | 2013180619 A1 | 12/2013 |
| WO | WO-2016165990 A1 * | 10/2016 | ............. A01C 7/042 |

OTHER PUBLICATIONS

European Examination Report for European Application No. 21 754 992.2 issued on Mar. 13, 2024.

* cited by examiner

GRAIN-SINGULATING APPARATUS WITH SEPARATING DEVICE, AND SEEDER WITH GRAIN-SINGULATING APPARATUS

The present application claims priority under 35 U.S.C. § 365 to International Application No. PCT/EP2021/072213 filed on Aug. 10, 2021, and under 35 U.S.C. § 119 to German Application Number DE 102020121869.9 filed on Aug. 20, 2020.

TECHNICAL FIELD

The present disclosure relates to a grain-singulating device.

BACKGROUND

Such a seeder with a grain-singulating apparatus is described in the German not pre-published application having the application number 102019130231. In a manner known per se, this grain-singulating apparatus has a metering chamber with a singulating disk arranged therein having grain entrainment openings. A singulating air flow generated by a blower can be fed to the metering chamber by way of at least one supply duct, such that grains can be singulated by way of the singulating disk using a pressure difference that arises in this way. The grains to be singulated are fed in the form of a mixed grain/air flow generated by a blower and a storage container to the grain-singulating apparatus via a conveying duct. A separating device is associated with the conveying duct for the singulation of the grains from the mixed grain/air flow and for providing them to the singulating disk via a seed chute from the separating device to the metering chamber for separation. The separation of the grains from the mixed grain/air flow furthermore results in an extracted air flow which is fed via an extracted air duct separate from the supply duct to the grain-singulating apparatus for singulation of the grains.

In this grain-singulating device, the extracted air duct is routed outwards from the separating device in a complex manner. An additional hose line is therefore required in order to feed the extracted air flow back to the desired point of the grain-singulating device. Firstly, this hose line is exposed to the harsh ambient conditions when the seeder is used in the field and, secondly, it must also be kept sealed in a particularly reliable manner in order to ensure the operationality of the grain-singulating device. Experiments have shown that this grain-singulating device then requires increased maintenance.

SUMMARY

There is therefore a need for grain-singulating apparatuses with improved extracted air guidance and seeders with such grain-singulating apparatuses.

According thereto, the grain-singulating apparatus comprises a metering chamber and a metering disk arranged therein; at least one supply duct for feeding a singulating air flow generated by a blower into the metering chamber for the singulation of grains by way of the singulating disk, a conveying duct for supplying the grains in the form of a mixed grain/air flow generated by a blower and a storage container and a separating device associated with the conveying duct for the separation of the grains from the mixed grain/air flow and for providing them via a seed chute to the singulating disk for singulation and for feeding the resulting extracted air flow via an extracted air duct separate from the supply duct to the grain-singulating apparatus for the singulation of the grains.

It is provided according to the at least one embodiment of the invention that the extracted air duct has an outlet opening for the outflow of the extracted air flow and extends from the separating device through the seed chute such that the outlet opening opens into the metering chamber.

The disclosure makes use of the finding that the extracted air duct is advantageously protected from external ambient influences by the routing through the seed chute both during use and in the transport or parking position. The maintenance effort is then significantly reduced. Furthermore, as a result of this measure, the separating device can be configured to be much more robust and airtight, since complex routing of the extracted air duct to the exterior can be dispensed with. This is also beneficial to the operational reliability of the grain-singulating device. An additional hose line, as previously, is therefore no longer required since the extracted air duct is integrated into the seed chute. The blower for generating the singulating air flow and the blower for generating the mixed grain/air flow can advantageously be two separate blowers. Alternatively, it is conceivable to use only a single blower.

In an advantageous development of the grain-singulating device according to the disclosure, the extracted air duct is configured as part of the seed chute by way of a partitioning element. The partitioning element preferably extends from the separating device to the outlet opening, so that it is configured to separate the extracted air flow, in particular pneumatically, from the grains separated by way of the separating device. The extracted air duct is therefore integrated into the seed chute, i.e. the extracted air duct is formed at least in part by the walls of the seed chute and is separated from the remainder of the seed chute by the partitioning element.

It is provided in a further advantageous development of the disclosure that the partitioning element is configured as a flat component, in particular as a partitioning plate. The available installation space is then best used in an advantageous manner and in particular no undercuts arise in which deposits can form or where grains can collect from the outside.

The grain-singulating device according to the disclosure is also advantageously further developed in that the supply duct has a feed opening for the singulating air flow to flow into the metering chamber, that the feed opening of the supply duct and the outlet opening of the extracted air duct have at least approximately the same spacing from the singulating disk, in particular from a plane that extends radially through the singulating disk. Experiments have shown that the extracted air flow and the singulating air flow surprisingly complement one another in a particularly advantageous manner for the singulation of the grains as a result of this arrangement. Furthermore, particularly favorable pressure conditions arise in the supply duct and in the extracted air duct as a result of this measure.

In order not to blow off singulated grains adhering to the singulating disk, a further advantageous development of the disclosure provides that the feed opening of the supply duct is arranged in such a way that a flow of the singulating air flow from the feed opening has no point of intersection with a plane that extends radially through the singulating disk. The feed opening therefore faces away from the singulating disk or is arranged at least approximately parallel to the singulating disk. Furthermore, pneumatic turbulences in the metering chamber are reduced as a result of this measure.

In order to further reduce pneumatic turbulence in the metering chamber, the outlet opening of the extracted air duct in a further advantageous development is arranged in such a way that a flow of the extracted air flow out of the outlet opening has no point of intersection with a plane which extends radially through the singulating disk. The outlet opening therefore faces away from the singulating disk or is arranged at least approximately parallel to the singulating disk, so that grains adhering to the singulating disk are not collected by the extracted air flow and blown off by the singulating disk. The outlet opening is preferably arranged in such a way that the direction of the extracted air flow intersects at least approximately the central axis of the singulating disk.

In a further advantageous embodiment of the grain-singulating device according to the disclosure, the separating device has an element that is permeable at least in part to air for the separation of the mixed grain/air flow into grains and extracted air flow and that is preferably configured as a strainer element. The element permeable to air is particularly preferably configured in the shape of a cylinder. In particular, the element permeable at least in part to air can be made of a tubular strainer element.

It is provided in a further particularly advantageous embodiment of the grain-singulating device according to the disclosure that the conveying duct has a conveying outlet from which the mixed grain/air flow is transferred in particular to the separating device, that the conveying outlet has a spacing to the element permeable to air in the direction of gravity of less than twice the diameter of the conveying duct. When the grain-singulating device is used as intended, the separating device is arranged above the metering chamber so that the separated grains can be provided to the singulating disk, in particular by gravity, through the seed chute and a shut-off valve. When used as intended, the conveying duct is preferably fed to the separating device from above so that the grains enter the separating device under the action of gravity and cannot lead to blockages in the conveying duct.

In order to ensure that the element permeable at least in part to air is at all times at least in part not covered by grains and therefore remains permeable to air, the conveying opening in a further advantageous development is arranged in the direction of gravity at least in part below the element permeable to air. The element permeable at least in part to air therefore remains at least largely free of grains above the conveying opening. At least largely no pneumatic dynamic pressure advantageously builds up on the separated grains in the seed chute, so that bridging and blockages are prevented.

In order to facilitate cleaning, maintenance and replacement of the element permeable at least in part to air, a further advantageous development of the grain-singulating device according to the disclosure provides that the element permeable at least in part to air can be removed without tools from a preferably positive-fit attachment to the separating device.

In a further advantageous embodiment of the grain-singulating device, the extracted air duct directly follows the element permeable at least in part to air. The extracted air flow is therefore transferred to the extracted air duct with almost no leakage, so that the largest possible amount of air can be used for the singulation of the grains. The degree of efficiency of the grain-singulating apparatus is thus increased in an expedient manner.

In order facilitate monitoring of the separating device by a user, it is provided in a further advantageous development of the grain-singulating device according to the disclosure that the separating device has a viewing window for the visual monitoring of the element permeable at least in part to air. The grains to be singulated are regularly treated with so-called dressing, which can become detached from the grains during work and clog the separating device, in particular the element permeable at least in part to air, so that this measure makes it easier for the user to avoid malfunction. The separating device can be configured to be in two parts, preferably consisting of an upper part and a lower part. The viewing window can be arranged on the upper side, preferably in the upper part of the separating device so that the user can look in from above in a particularly simple and expedient manner. The upper part is preferably made of transparent material so that the entire upper part can serve as a viewing window.

It is provided in a further advantageous development of the grain-singulating apparatus according to the disclosure that the conveying duct has a conveying opening, from which the mixed grain/air flow is transferred in particular to the separating device, that the conveying outlet has a spacing from the lower edge of the separating device and/or the seed chute that corresponds to a maximum of four times the diameter of the conveying duct. The spacing between the conveying opening and the lower edge of the separating device and/or the seed chute preferably corresponds to less than four times the diameter of the conveying duct. The separating device then has a particularly compact structure. Furthermore, the pneumatic pressure and the pressure from the weight of the grains themselves upon the separated grains in the seed chute is reduced as a result of this measure, which is detrimental for bridging and blockages in a beneficial manner.

The object is furthermore satisfied by a seeder with at least one blower, at least one storage container for granular material and at least one grain-singulating apparatus, where the at least one blower is configured to generate at least one singulating air flow and/or at least one mixed grain/air flow with grains stored in the storage container. It is provided according to the disclosure that the at least one grain-singulating apparatus is configured according to at least one of the above embodiments. For the advantages and further developments according to the disclosure, reference is made to the embodiments of the grain-singulating device.

The seeder preferably has a plurality of grain-singulating apparatuses, where the seeder comprises a corresponding plurality of supply ducts and conveying ducts for respectively feeding a singulating air flow and a mixed grain/air flow to the grain-singulating apparatuses. It is conceivable that the seeder feeds at least two grain-singulating devices with a single conveying duct between at least one of the at least two grain-singulating devices and the storage container with the blower, where the mixed grain/air flow can be forwarded at least in part from the grain-singulating device connected to the conveying duct by way of an intermediate conveying duct to the at least one further grain-singulating apparatus. The intermediate conveying duct can be configured as a Y-shaped intermediate piece or can comprise such an intermediate piece. It is also conceivable for the seeder to have separate conveying ducts and/or supply ducts for each grain-singulating apparatus. The seeder can have a blower for generating the singulating air flows and the mixed grain/air flows or can provide the singulating air flows and mixed grain/air flows by way of separate blowers. The storage container can have a metering device for controlled dispensing of the quantity of grains into the at least one conveying duct. The seeder can have a distribution unit for the mixed grain/air flow, to which, firstly, at least one blower and at least one storage container are connected and, secondly, from which a plurality of conveying ducts extends to the grain-singulating apparatuses. The seeder can have two or more storage containers; at least one storage container can then be used to store fertilizer.

Further details of the disclosure can be gathered from the description of the examples and the drawings, where the drawings include the following figures.

DETAILED DESCRIPTION

Figure 1:
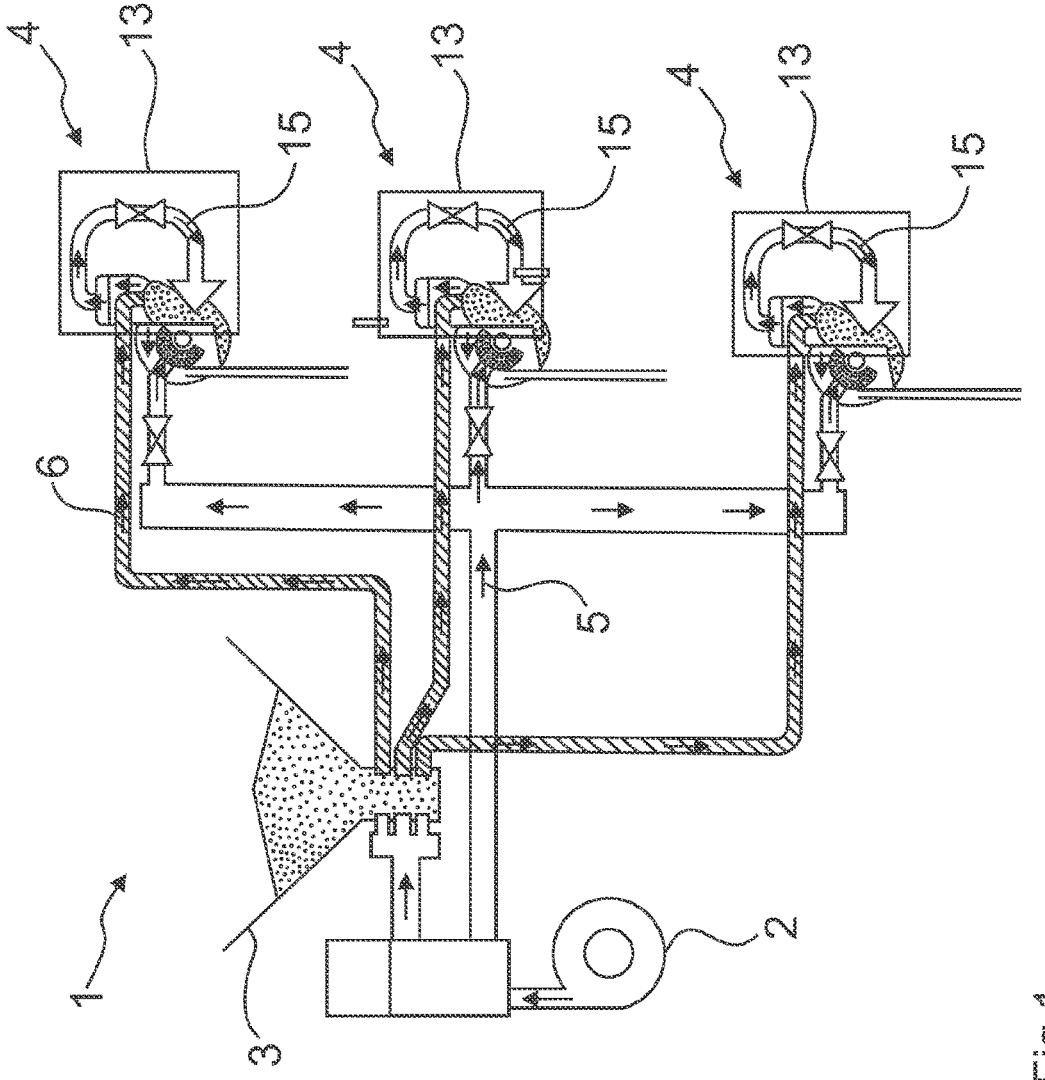
FIG. 1 shows a schematic seeder with a grain-singulating device according to at least one embodiment of the invention.

A seeder 1 according to the at least one embodiment of invention can be seen in a schematic view in FIG. 1. Seeder 1 comprises a blower 2, a storage container 3 for granular material, in this case seed to be singulated, and a plurality of grain-singulating apparatuses 4, where only three of the plurality of grain-singulating apparatuses 4 are depicted by way of example. Blower 2 is configured to generate a singulating air flow 5 and a mixed grain/air flow 6, which divides into several mixed grain/air flows 6, with seed grains stored in storage container 3. It is conceivable in an alternative embodiment that is not shown that separate blowers 2 are provided for generating singulating air flow 5 and mixed grain/air flow 6. A singulating air flow 5 and a mixed grain/air flow 6 are fed to individual grain-singulating apparatuses 4 from blower 2 and storage container 3, so that grain-singulating apparatuses 4 have seed grains and a singulating air flow 5 available for work.

Figure 2:
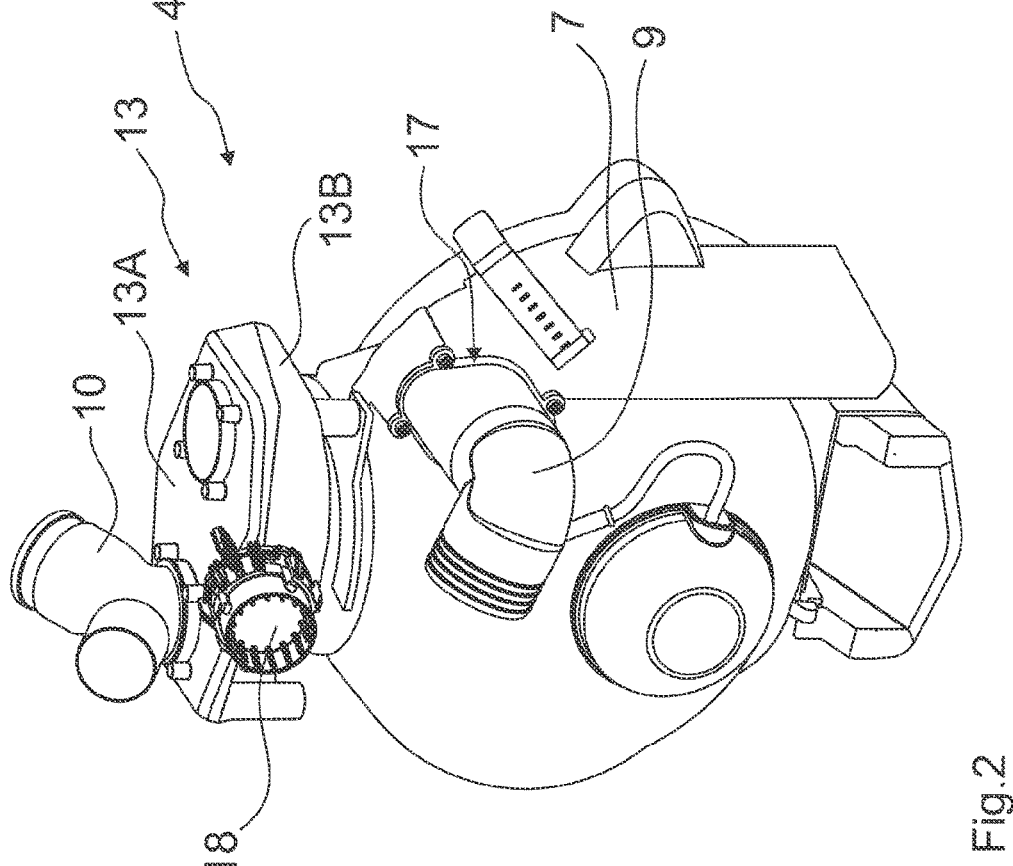
FIG. 2 shows a grain-singulating device according to at least one embodiment of the invention in a perspective detailed view.

Grain-singulating apparatuses 4 operate as follows: Grain-singulating apparatus 4, as shown in FIG. 2, has a metering chamber 7 with a singulating disk 8 arranged therein. Singulating air flow 5 generated by blower 2 can be fed to metering chamber 7 by way of a supply duct 9. Singulating air flow 5 ensures in a manner known per se that seed grains adhere to singulating disk 8 at regular spacings and are thus singulated. A conveying duct 10 is provided for providing grain-singulating device 4 with seed grains for singulation. The grains are supplied by way of conveying duct 10 in the form of mixed grain/air flow 6 generated by blower 2 and storage container 3. A separating device 13 is provided for the separation of the seeds from mixed grain/air flow 6 and for providing them via a seed chute 11 to singulating disk 8 for singulation and also for feeding resulting extracted air flow 15 via an extracted air duct 12 separate from supply duct 9 for singulation.

Figure 3:
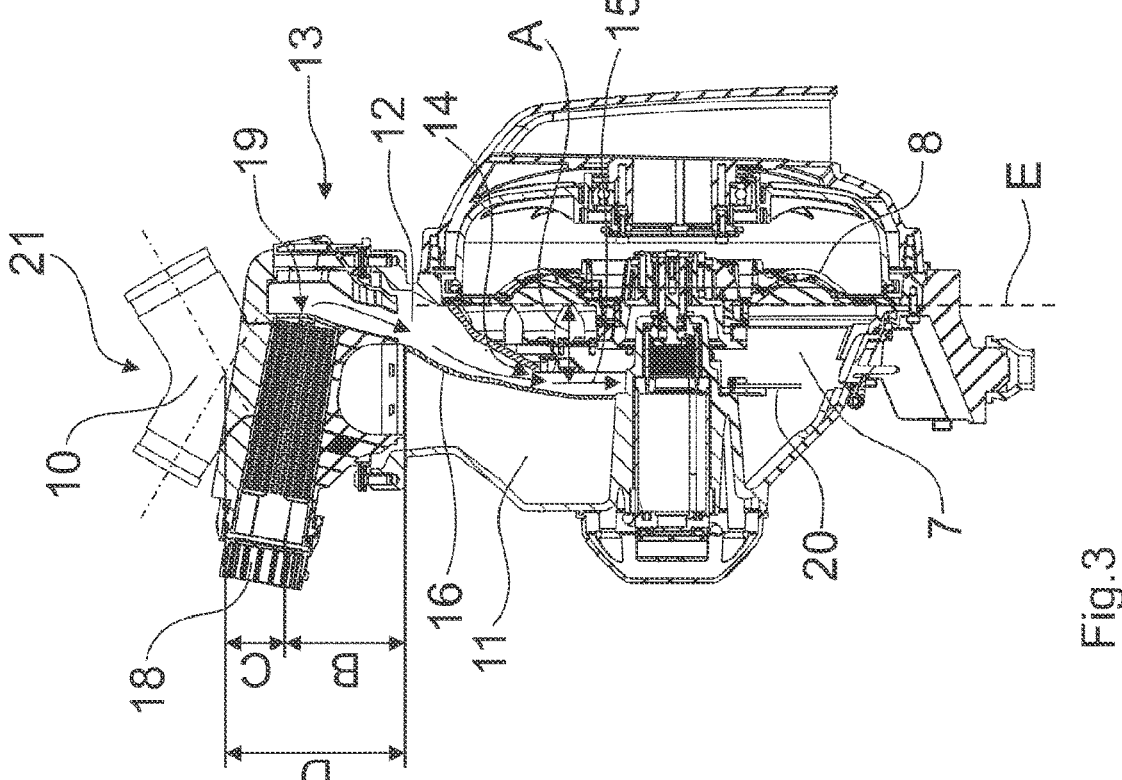
FIG. 3 shows the grain-singulating apparatus in a sectional view.

As shown in FIG. 3, extracted air duct 12 has an outlet opening 14 for the outflow of extracted air flow 15 into metering chamber 7. Extracted air duct 12 furthermore extends from separating device 13 through seed chute 11 so that outlet opening 14 opens directly into metering chamber 7. Extracted air duct 12 is therefore integrated into seed chute 11, which has the advantage that it is not exposed to the ambient conditions and is therefore configured to be more durable A partitioning element 16 is provided in order to integrate extracted air duct 12 into seed chute 11.

Extracted air duct 12 is formed as part of seed chute 11 by way of partitioning element 16 that is configured as a flat partitioning plate, such that extracted air duct 12 is formed at least in part by the walls of seed chute 11. Partitioning element 16 extends from separating device 13 to outlet opening 14 so that it is configured to separate extracted air flow 15 pneumatically from the grains separated by way of the separating device 13.

Supply duct 9 has a feed opening 17 for singulating air flow 5 to outflow into metering chamber 7. In order to create particularly favorable pressure conditions between extracted air flow 15 and singulating air flow 5, it is provided that feed opening 17 of supply duct 9 and outlet opening 14 of extracted air duct 12 have at least approximately the same spacing A from singulating disk 8 or from a plane E that extends radially through singulating disk 8, respectively.

In order to not blow off singulated grains already adhering to singulating disk 8, it is provided that outlet opening 14 is arranged in such a way that the flow of extracted air flow 15 out of outlet opening 14 has no point of intersection with plane E. As shown by FIG. 3, outlet opening 14 is oriented in such a way that extracted air flow 15 is introduced into metering chamber 7 at least approximately parallel to singulating disk 8. It is provided in this grain-singulating apparatus 4 that extracted air flow 15 intersects the central axis of singulating disk 8. In an embodiment that is not shown, it would be conceivable for outlet opening 14 to face away from singulating disk 8. Furthermore, it is provided that feed opening 17 of supply duct 9 is arranged in such a way that the flow of singulating air flow 5 out of feed opening 17 has no point of intersection with the plane E, which extends radially through singulating disk 8.

As furthermore shown in FIGS. 2 and 3, separating device 13 has an element permeable at least in part to air that is configured as a cylindrical strainer element 18. This strainer element 18 is provided for separation of the mixed grain/air flow 6 into grains and extracted air flow 15. Strainer element 18 is arranged at least approximately transversely, preferably obliquely, in separating device 13 and is created in such a way that the seeds to be separated cannot pass through and therefore reach seed chute 11 under the effect of gravity. Extracted air flow 15 resulting from the separation, on the other hand, can pass through strainer element 18 and enter extracted air duct 12 directly following strainer element 18. In order to ensure that strainer element 18 is not completely covered by seed grains so that the passage of extracted air flow 15 is impaired or even prevented, it is provided that conveying duct 10 has a conveying opening 19 from which the mixed grain/air flow is transferred to separating device 13 which is arranged in the direction of gravity at least in part below strainer element 18. Extracted air flow 15 can therefore be reliably discharged through extracted air duct 12 at all times and no dynamic pressure advantageously arises at least largely that weighs on the grains located in seed chute 11. In particular, conveying opening 19 has a smaller vertical spacing from the central axis of singulating disk 8 than at least parts of strainer element 18. It is provided in a further embodiment that is not shown that conveying opening 19 has a spacing in the direction of gravity of less than twice the diameter of conveying duct 10 from strainer element 18. This spacing is measured from strainer element 18 upwards opposite to the direction of gravity toward conveying opening 19 so that separating device 13 is of compact design also in this embodiment which is not shown.

When used as intended, grain-singulating device 4 is regularly arranged in such a way that separating device 13 is arranged above metering chamber 7. The separated grains can therefore be provided to singulating disk 8 under the effect of gravity via seed chute 11 and a shut-off valve 20. Conveying duct 10 is regularly supplied to separating device 13 preferably from above, so that the grains in the mixed grain/air flow cannot come to a standstill in conveying duct 10.

Conveying opening 19 in this grain-singulating device 4 is arranged such that it has a spacing B from the lower edge of separating device 13 and the upper edge of seed chute 11 that corresponds at most to four times the diameter of conveying duct 10. The diameter preferably corresponds to the clear width of the opening from which the mixed grain/air flow is transferred to separating device 13, i.e. in particular to the diameter of conveying opening 19. It is particularly preferred to have spacing B correspond to a maximum of twice the diameter of conveying duct 10.

Conveying duct 10 also has a Y-shaped intermediate piece 21 at its connection to separating device 13. Alternatively or additionally, conveying opening 19 has a spacing C from Y-shaped intermediate piece 21 of conveying duct 10 that corresponds at most to twice the diameter of conveying duct 10. The diameter preferably corresponds to the clear width of the opening from which the mixed grain/air flow is transferred to separating device 13, i.e. in particular to the diameter of conveying opening 19. Y-shaped intermediate piece 21 can be used for forwarding part of mixed grain/air flow 6 fed to a grain-singulating device 4 to a further grain-singulating apparatus 4. At least two grain-singulating apparatuses 4 can then be connected in series and supplied with a mixed grain/air flow 6 from a single conveying duct 10. In an embodiment that is not shown, intermediate piece 21 can be not Y-shaped but L-shaped so that only a single grain-singulating device 4 can be supplied with mixed grain/air flow 6 by way of intermediate piece 21.

Particularly preferably, alternatively or additionally, intermediate piece 21 has a spacing D from the lower edge of the separating device and/or seed chute 11 that corresponds to less than six times the diameter of conveying duct 10. In particular, the diameter corresponds to the diameter of conveying opening 19.

In order to enable, firstly, rapid and easy maintenance and, secondly, the performance of reliable operational monitoring, it is provided that, firstly, strainer element 18 is removeable without tools from a positive-fit attachment to separating device 13 and, secondly, separating device 13 has a viewing window for visual monitoring of strainer element 18. In an embodiment of grain-singulating apparatus 4 that is not shown, it is conceivable that grain-singulating apparatus 4 has only one of these measures to ensure fault-free operation.

In this grain-singulating apparatus 4, separating device 13 is configured to have at least two parts so that it has an upper part 13A and a lower part 13B. Upper part 13A in this grain-singulating apparatus 4 is made of transparent material so that entire upper part 13A can serve as a viewing window. Alternatively, it is conceivable in an embodiment that is not shown that separating device 13 is created in part from transparent material or has a cutout thereto, so that a viewing window is created. The viewing window is preferably arranged on the upper side of separating device 13 so that a user can easily monitor strainer element 18 from above for blockages. The viewing window is configured in such a way that strainer element 18 is visible.

Figure 4:
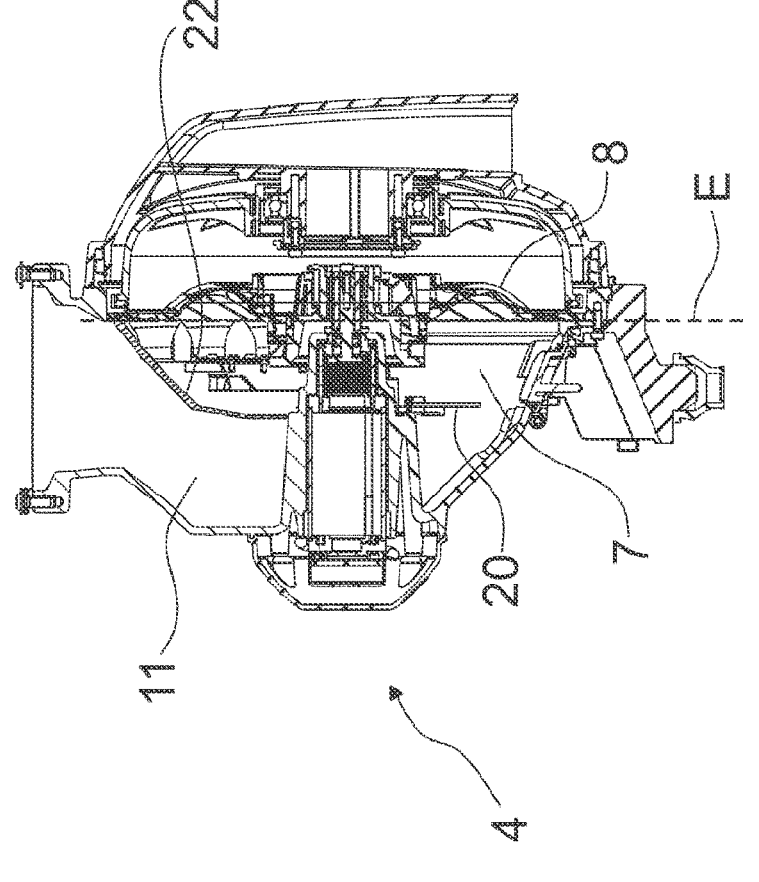
FIG. 4 shows a further embodiment of a grain-singulating apparatus in a sectional view.

A further alternative embodiment of a grain-singulating apparatus 4 is shown in FIG. 4 in a sectional view. In comparison to grain-singulating device 4 described above, this grain-singulating device 4 has a closing plate 22 instead of partitioning element 16 configured as a partitioning plate. Instead of grains separated from mixed grain/air flow 6 fed via conveying duct 10 by way of separating device 13, this grain-singulating device 4 is configured to provide singulating disk 8 with grains for singulation via a seed container (not shown) that is connectable to seed chute 11. All other components being identical, this grain-singulating device 4 is therefore configured by way of closing plate 22 to be operated with the seed container which dispenses the grains to be singulated into seed chute 11 under the influence of gravity. The grains to be singulated consequently pass through seed chute 11 and shut-off valve 20 to singulating disk 8. The grains are stimulated to adhere to singulating disk 8 by way of singulating air flow 5 into metering chamber 7 and are thus singulated. Extracted air duct 12 is closed by way of closing plate 22 between metering chamber 7 and seed chute 11 so that seed chute 11 only serves to feed grains to be singulated to singulating disk 8. From a manufacturing perspective, this embodiment has the advantage that, by replacing partitioning element 16 with closing plate 22, an otherwise structurally identical grain-singulating device 4 can be converted for operation with a seed container instead of a conveying duct 10 with an associated separating device 13. Furthermore, grain-singulating devices 4 can be converted in a simple manner for the respective use with a separating device 13 or a seed container by the exchange of partitioning element 16 with closing plate 22.

Closing plate 22 can preferably be inserted manually into grain-singulating apparatus 4 in a releasable manner. Partitioning element 16 can preferably be dismantled manually. Alternatively, it is conceivable that partitioning element 16 and closing plate 22 are one and the same component which can be pivoted between a first position as a partitioning element 16 for forming extracted air duct 12 and a second position for closing extracted air duct 12. Grain-singulating device 4 can have an interface to which partitioning element 16 and closing plate 22 can be attached. The interface can be arranged in seed chute 11. Partitioning element 16 and/or closing plate 22 can be attached in grain-singulating device 4 by way of a quick-release connection. Alternatively, it is conceivable that partitioning element 16 and closing plate 22 are the same component which is arranged to be pivotable at the interface.

LIST OF REFERENCE NUMERALS

1 seeder

2 blower

3 storage container

4 grain-singulating apparatus

5 singulating air flow

6 mixed grain/air flow

7 metering chamber

8 singulating disk

9 supply duct

10 conveying duct

11 seed chute

12 extracted air duct

13 separating device

13A upper part

13B lower part

14 outlet opening

15 extracted air flow
16 partition element
17 feed opening
A spacing
E plane
18 strainer element
19 conveying outlet
20 shut-off valve
B spacing
C spacing
21 intermediate piece
D spacing
22 closing plate

The invention claimed is:

1. A grain-singulating apparatus comprising:
a metering chamber and a singulating disk arranged therein;
at least one supply duct for feeding a singulating air flow generated by a blower into said metering chamber for the singulation of grains by way of said singulating disk;
a conveying duct for supplying the grains stored in a storage container, in the form of a mixed grain/air flow generated by the blower;
a separator for the separation of the grains from said mixed grain/air flow and for providing the grains via a seed chute to said singulating disk for singulation and for feeding the resulting extracted air flow via an extracted air duct separate from said supply duct to said grain-singulating apparatus for the singulation of the grains,
wherein said extracted air duct has an outlet opening for the outflow of said extracted air flow and extends from said separator through said seed chute such that said outlet opening opens into said metering chamber.

2. The grain-singulating device according to claim 1, wherein said extracted air duct is formed by way of a partitioning element as part of said seed chute.

3. The grain-singulating device according to claim 2, wherein said partitioning element is configured as a flat component.

4. The grain-singulating apparatus according to claim 3, wherein the flat component is a partition plate.

5. The grain-singulating device according to claim 1, wherein said supply duct has a feed opening through which said singulating air flow flows into said metering chamber, said feed opening of said supply duct and said outlet opening of said extracted air duct have approximately the same spacing from said singulating disk, from a plane that extends radially through said singulating disk.

6. The grain-singulating apparatus according to claim 5, wherein said feed opening of said supply duct is arranged such that a flow of said singulating air flow out of said feed opening has no point of intersection with the plane that extends radially through said singulating disk.

7. The grain-singulating apparatus according to claim 1, wherein said outlet opening of said extracted air duct is arranged such that a flow of the extracted air flow out of said outlet opening has no point of intersection with a plane that extends radially through said singulating disk.

8. The grain-singulating apparatus according to claim 1, wherein said separator has an element that is permeable at least in part to air for the separation of the mixed grain/air flow into grains and extracted air flow and that is configured as a strainer element, which is cylindrical.

9. The grain-singulating device according to claim 8, wherein said conveying duct has a conveying outlet from which the mixed grain/air flow is transferred to said separator, that said conveying outlet has a spacing from said element permeable to air in the direction of gravity of less than twice the diameter of the conveying duct.

10. The grain-singulating apparatus according to claim 9, wherein said conveying outlet is arranged in the direction of gravity at least in part below said element permeable to air.

11. The grain-singulating apparatus according to claim 8, wherein said element permeable at least in part to air is configured to be removed without tools from a positive-fit attachment to said separator.

12. The grain-singulating apparatus according to claim 8, wherein said extracted air duct directly follows said element permeable at least in part to air.

13. The grain-singulating apparatus according to claim 8, wherein said separator has a viewing window for the visual monitoring of said element permeable at least in part to air.

14. The grain-singulating apparatus according to claim 1, wherein said conveying duct has a conveying opening, from which the mixed grain/air flow is transferred to said separator, that said conveying opening has a spacing from the lower edge of said separator and/or said seed chute that corresponds to a maximum of four times the diameter of said conveying duct.

15. A seeder comprising:
at least one blower;
at least one storage container for granular material; and
at least one grain-singulating apparatus as set forth in claim 1, wherein said at least one blower is configured to generate at least one singulating air flow and/or at least one mixed grain/air flow with grains stored in said storage container.

* * * * *